United States Patent [19]

Masuyama

[11] Patent Number: 4,774,683
[45] Date of Patent: Sep. 27, 1988

[54] ELECTRONIC WEIGHT MEASURING DEVICE

[75] Inventor: Tsutomu Masuyama, Numazu, Japan

[73] Assignee: Tokyo Electric Co., Ltd., Tokyo, Japan

[21] Appl. No.: 940,846

[22] Filed: Dec. 12, 1986

[30] Foreign Application Priority Data

Dec. 24, 1985 [JP] Japan .................................. 60-291729

[51] Int. Cl.⁴ ........................ G06F 15/20; G01F 25/00
[52] U.S. Cl. ..................................... 364/567; 177/25;
364/466; 364/571.05; 364/709.15
[58] Field of Search ............... 364/466, 567, 570, 709,
364/571; 177/25.11, 25.12, 25.13, 165, DIG. 3

[56] References Cited

U.S. PATENT DOCUMENTS

| | | | |
|---|---|---|---|
| 4,412,591 | 11/1983 | Reichmuth et al. | 177/165 |
| 4,535,854 | 8/1985 | Gard et al. | 177/25.13 |
| 4,535,857 | 8/1985 | Haze | 177/DIG. 3 |
| 4,545,022 | 10/1985 | Hughins | 364/709 |
| 4,660,663 | 4/1987 | Amacher et al. | 177/165 |
| 4,685,525 | 8/1987 | Knothe et al. | 177/165 |

*Primary Examiner*—Parshotam S. Lall
*Assistant Examiner*—Kevin J. Teska
*Attorney, Agent, or Firm*—Frishauf, Holtz, Goodman & Woodward

[57] ABSTRACT

An electronic weight measuring device has a data generator for generating the data according to an applied weight, a first memory, and a data processing unit for respectively storing the zero point data and span data into first and second memory areas in the first memory. This measuring device further has a second memory, for selectively storing the first and second mode data, and a data setting key. When the data setting key is depressed, if it is detected that the first mode data is stored in the second memory, the data processing unit allows the data from the data generator to be stored as the zero point data into the first memory area of the first memory, and also allows the second mode data to be stored into the second memory. When it is detected that the second mode data is stored in the first memory, the data processing unit allows the data from the data generator to be stored as the span data into the second memory area in the first memory, and also allows the first mode data to be stored into the second memory area.

10 Claims, 5 Drawing Sheets

ELECTRONIC WEIGHT MEASURING DEVICE

BACKGROUND OF THE INVENTION

The present invention relates to an electronic weight measuring device.

In general, in an electronic weight measuring device, to accurately measure the weight, it is necessary to preliminarily set the zero point and span of this device. Therefore, hitherto, the electronic weight measuring device is provided with a zero point setting key and a span setting key. In the case of setting the zero point, the weight measuring device is put into an unloaded state and the zero-point setting key is operated. In the case of setting the span, the weight measuring device is applied with a rated weight and the span setting key is operated in this state.

FIG. 1 is a flowchart showing the operations to set the zero point and span. When the first key is depressed in the test mode set by the mode setting switch, the zero point data is set. When the second key is depressed, the span data is set.

In such a kind of electronic weight measuring device, a count value C1 obtained when the zero point was set and a count value C2 derived when the span was set are stored into a nonvolatile RAM. Span data SD is given as a difference between count values $C_1$ and $C_2$ and stored into the nonvolatile RAM. The span coefficient which is calculated from span data SD and a predetermined span count value is also stored into this RAM. In the case of checking the resultant span data to see if it is proper or not, the count value which is derived when a weight of a rated weight was put on the weight measuring device is multiplied with the span coefficient and thereafter, the resultant count value is displayed. Therefore, by merely checking whether the displayed count value coincides with the span count value or not, it is possible to determine whether the span data stored in the nonvolatile RAM is correct or not.

However, in the case of such a conventional method, two keys must be used to set both of the zero point and the span, so that the demand to reduce the size and cost of the electronic weight measuring device cannot be satisfied.

SUMMARY OF THE INVENTION

It is an object of the present invention to provide an electronic weight measuring device of a simple structure.

The above object is accomplished by an electronic weight measuring device comprising: a data generator, for generating data according to an applied weight; a first memory, for selectively storing first and second mode data; a key; a second memory; and a data processing unit, for allowing the data from the data generator to be stored as the zero point data into the first memory area of the second memory, and also allowing the second mode data to be stored into the first memory, in the case where it is detected that the first mode data is stored in the first memory when the key is depressed, and for allowing the difference between the data from the data generator and the data stored in the first memory area of the second memory to be stored as the span data into the second memory area of the second memory, and also allowing the first mode data to be stored into the first memory, in the case where it is detected that the second mode data is stored in the first memory.

In this invention, by depressing the same key, the zero point data and span data can be set. Therefore, the number of keys which are used to set those data can be reduced. Thus, the constitution of the whole electronic weight measuring device can be simplified.

DETAILED DESCRIPTION OF THE PREFERRED EMBODIMENTS

Figure 1:
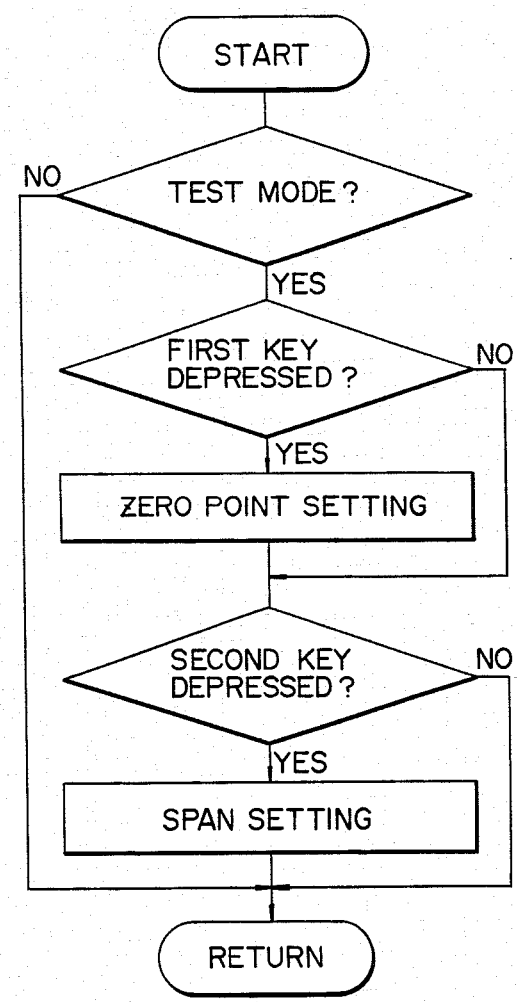
FIG. 1 is a flowchart showing the operations to set the zero point data and span data in a conventional electronic weight measuring device.
Figure 2:
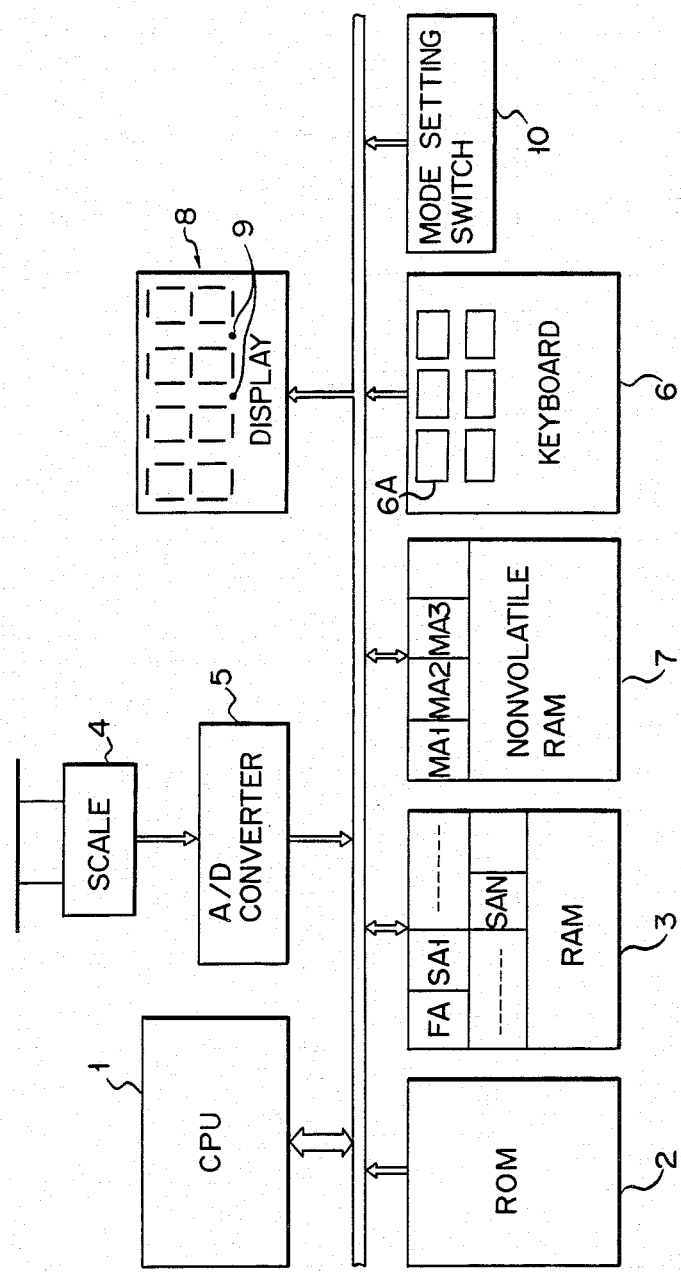
FIG. 2 is a block diagram of an electronic weight measuring device according to an embodiment of the present invention.

An electronic weight measuring device according to an embodiment of the present invention will be described with reference to FIGS. 2 to 4. As shown in FIG. 2, the electronic weight measuring device comprises: a CPU 1; a ROM 2 and a RAM 3 connected to CPU 1; and a load cell scale 4 connected to CPU 1 through an A/D converter 5. The programs which are executed by CPU 1 are stored in ROM 2. A flag area FA to store a flag FX indicative of the zero point setting mode and memory areas $SA_1$ to $SA_N$ to sequentially store the sampled data from A/D converter 5 are provided in RAM 3.

A keyboard 6 including a key 6A for setting both the zero point and span is also connected to CPU 1. Keyboard 6 further includes various kinds of keys such as numeral keys, tare key, clear key, and the like. Moreover, a nonvolatile RAM 7, a four-digit display unit 8, and a mode setting switch 10 for setting the weight measuring mode, test mode, and the like are also connected to CPU 1. RAM 7 has therein memory areas $MA_1$ to $MA_3$, for storing the zero point data, span data, and span coefficient, respectively. Display unit 8 has two decimal point indicating lamps 9.

Figure 3:
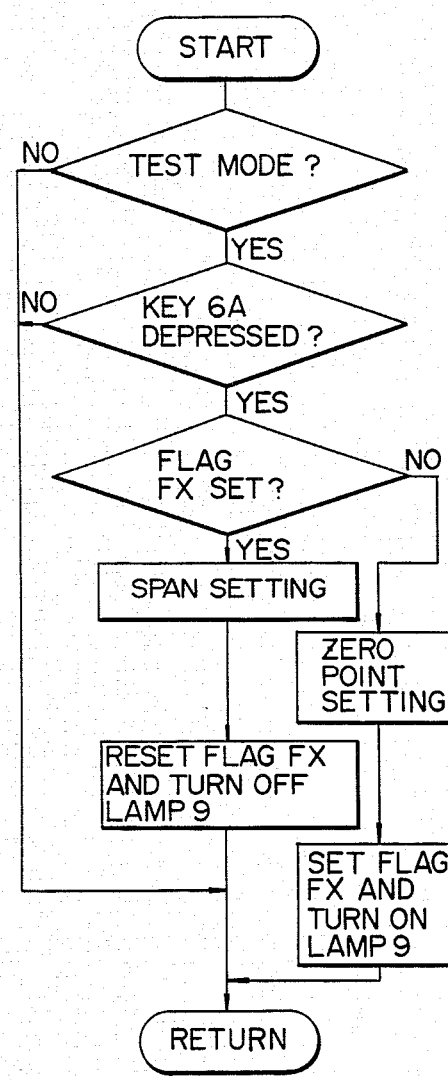
FIG. 3 is a flowchart showing the operations to set the zero point data and span data in the electronic weight measuring device shown in FIG. 2.
Figure 4:
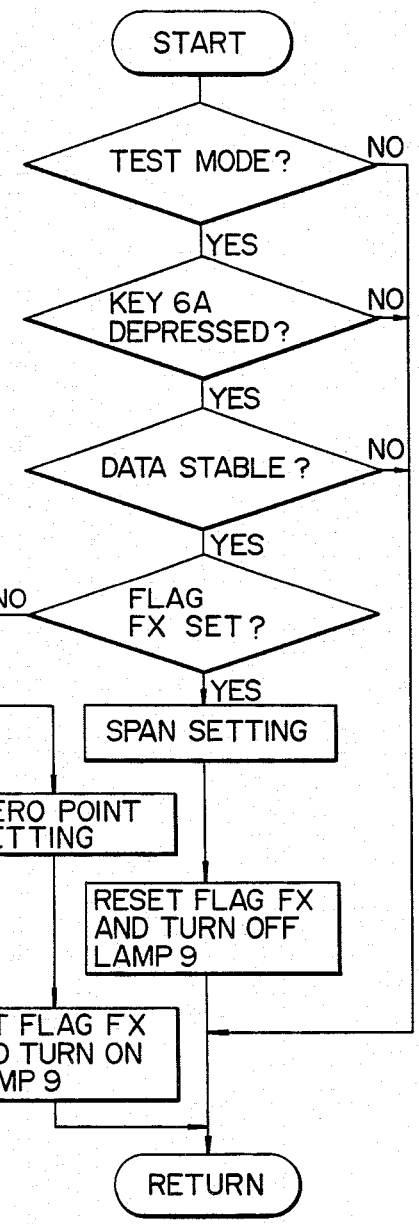
FIGS. 4 to 6 are flowcharts showing the operations to set the zero point data and span data in electronic weight measuring devices according to other embodiments of the invention.

In the foregoing construction, the zero point and span are set in accordance with a flowchart shown in FIG. 3. In this embodiment, a description will be made on the assumption that the zero point data is approximately 3000 counts and the rated span count is 4000 counts. First, the processes are executed in the test mode for setting the zero point data or span data. The test mode is set by mode setting switch 10. When key 6A is depressed in the state in which nothing is put on a weight-receiving plate of load cell scale 4, CPU 1 decides that the zero point setting mode is set because flag FX of "0" has already been stored in flag area FA. Therefore, the count data from A/D converter 5 is stored as the zero point data into memory area $MA_1$ in nonvolatile RAM 7. Flag FX indicating that the zero point has been set is set into flag area FA in RAM 3. In this embodiment, flag FX is used as means for discriminating the set mode. Next, when key 6A is again depressed in the state in which a weight of a rated weight was put on the weight receiving plate of load cell scale 5, CPU 1 detects that the zero point has already been set since flag FX is set. Thus, CPU 1 determines that the span setting mode is set. Then, the value which is derived by subtracting the zero point data in memory area $MA_1$ from the count data from A/D converter 5 is written as the span data into memory area $MA_2$ in RAM 7. Then, flag FX, indicative of the zero-point setting mode is reset to "0". Therefore, when key 6A is next depressed, the zero-point setting mode is set. In a manner similar to the above, each time key 6A is depressed, the zero-point setting mode and span setting mode are alternately set. As described above, the zero point and span are set by depressing a single key 6A. On the basis of the zero point data and span data derived in this way, the display data is given by the following expression.

(count data) × (4000) ÷ (span data)

The count data, indicative of the difference between the count data from A/D converter 5 and the zero point data, is converted into the count value when the value of the rated span count assumes 4000. In the test mode, CPU 1 allows the count value obtained as described above to be displayed on display unit 8.

To inform the operator of the fact that such setting operations of the zero point data and span data are being executed, in this embodiment, at least one of decimal point indicating lamps 9 in display unit 8 is kept lit after the zero point has been set. Thus, the operator can know which mode is presently being set.

The second embodiment of the invention will now be described with reference to FIG. 4. In the foregoing operations for setting the zero point and span, if the data to be stored into nonvolatile RAM 7 is not the stable data, even when the operator is sure that he has set the zero point data and span data, other values which are not concerned with the actual data may be set. To prevent this, in this embodiment, in the processes to obtain the true values, a plurality of continuous smpling data obtained are held in nonvolatile RAM 7 and when a predetermined number of sampling data stored in RAM 7 are the same value, for example, the data from A/D converter 5 is determined to be stable and the zero point data and span data are stored into RAM 7. In this way, by avoiding the execution of the processes to set the zero point and span when the data is unstable, the zero point and span can be set with a high reliability. The states of flag FX and lamps 9 are not changed so long as the zero point data or span data is not newly set.

Figure 5:
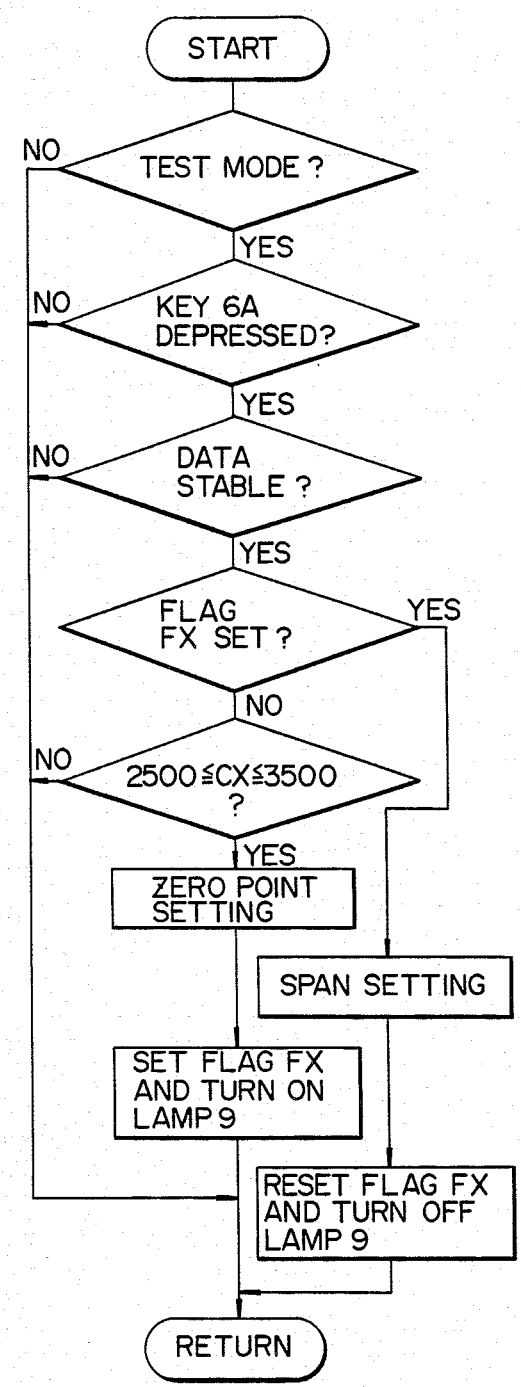

The third embodiment of the invention will now be described with reference to FIG. 5. In the process to set the zero point, this embodiment intends to prevent the data from being written into nonvolatile RAM 7 in the state in which something is put on the weight receiving plate of load cell scale 4. For this purpose, in setting of the zero point, if the count value obtained frcm A/D converter 5 is out of a range of 3000±500, it is decided that the load cell scale 4 is not set in the unloaded state. Namely, it is determined that something is placed on the weight receiving plate of load cell scale 4, thereby preventing the data from being stored into RAM 7.

Figure 6:
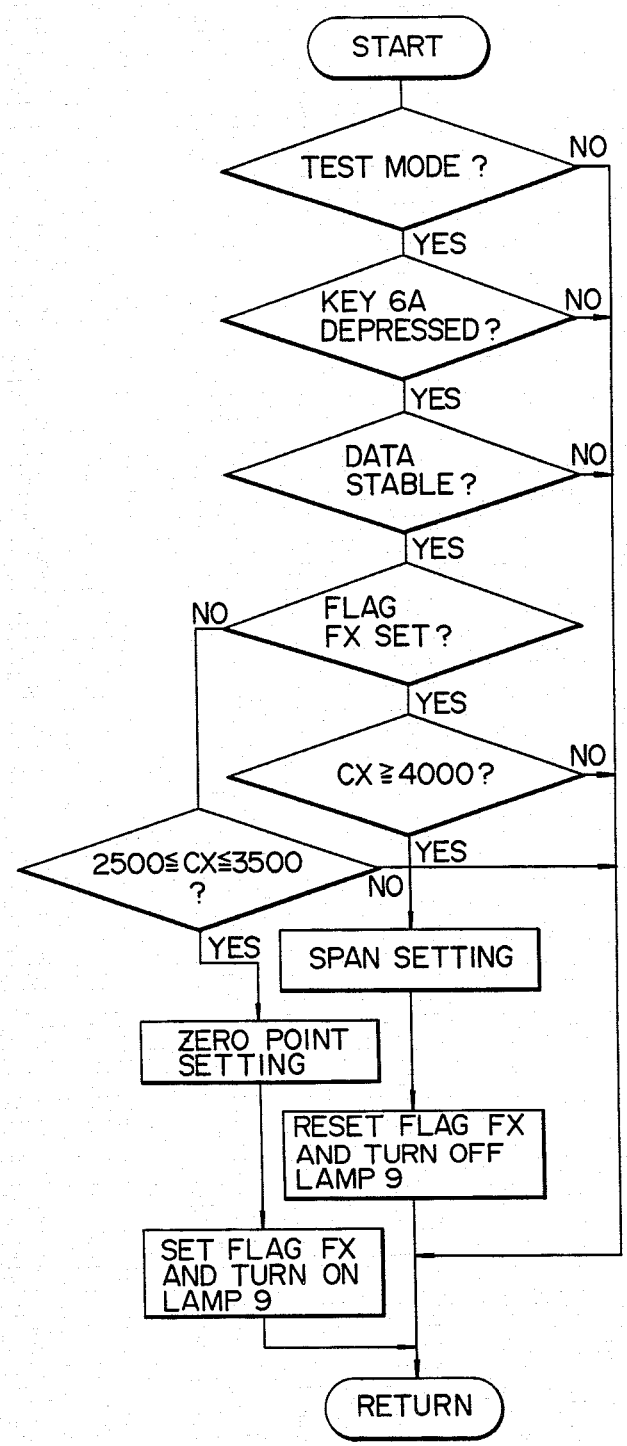

Further, the fourth embodiment of the invention will be explained with reference to FIG. 6. According to the foregoing first embodiment and the like, when the operator intends to set the zero point by depressing key 6A in the state in which nothing is put on the weight receiving plate of load cell scale 4, there is the case where key 6A is erroneously depressed twice due to some reason. In this case, the setting of the zero point setting mode is determined by the first depression of key 6A, so that the zero point data is stored into RAM 7. Subsequently, by the second depression of key 6A just after the first depression, it is determined that the span setting mode has been set. Thus, the count value which was obtained in the state in which nothing is actually put on the weight receiving plate of load cell scale 4 is errroreously written as the span data into RAM 7. To prevent this, in this embodiment, even if key 6A is successively depressed twice, if the value which is obtained by subtracting the zero point data from the count data derived in such a double-depression case is smaller than the count value of 4000, it is decided that the load cell scale 4 is not set in the rated load state. In other words, it is decided that resultant data is the data which is obtained when the weight of the rated weight is not put on the weight receiving plate of load cell scale 4, thereby preventing the data from being written into RAM 7. The reason why the data cannot be processed as the proper span data if the count value is smaller than, e.g., 4000 is to prevent the span coefficient (=rated span count number/span data) from becoming larger than 1. In other words, it is because the apparent resolution of load cell scale 4 is made higher if the span coefficient is larger than 1.

Although the present invention has been described with respect to the illustrated embodiments, the invention is not limited to only these embodiments. For example, although decimal point indicating lamps 9 are lit when flag FX is set in the foregoing embodiments, they may be lit when flag FX is reset. Or, in place of lamps 9, all of the display segments in all digits may be also lit.

What is claimed is:

1. An electronic weight measuring device comprising:

data generating means, responsive to a weight applied to the electronic weight measuring device, for generating data representing said weight;

a keyboard including a single data setting key;

first memory means for selectively storing, in response to a key operation of said single data setting key, either one of first mode data designating a zero point setting mode of the electronic weight measuring device, and second mode data designating a span setting mode of the electronic weight measuring device;

second memory means, having a first memory area for storing zero point data representing a zero point of the electronic weight measuring device, a second memory area for storing span data representing a difference between said zero point and a span point which is obtained by applying a weight to the electronic weight measuring device, and a flag area for storing flag data, each key operation of said single data setting key causing a change in state of said flag data stored in said flag area; and data processing means, coupled to said data generating means, to said keyboard, to said first memory means, and to said second memory means;

said data processing means including means for causing said data representing said weight, generated by said data generating means, to be stored as said zero point data in said first memory area of said second memory means when said flag data in said flag area is in a first state, and for causing said first mode data to be stored in said first memory means if said second mode data is already stored in said first memory means; and said data processing means further including means for causing said difference between said zero point and said span point to be stored as said span data in said second memory area of said second memory means when said flag data in said flag area is in a second state, and for causing said second mode data to be stored in said first memory means if said first mode data is already stored in said first memory means.

2. The electronic weight measuring device of claim 1, wherein said data processing means further includes means for detecting that the data from said data generating means is out of a predetermined range, and for preventing the difference between the out of range data and the zero point data from being stored as span data in said second memory area of said second memory means.

3. The electronic weight measuring device of claim 1, wherein said data processing means further includes means for detecting that the data from said data generating means is out of a predetermined range, and for preventing the out of range data from being stored as zero point data in said first memory area of said second memory means.

4. The electrical weight measuring device of claim 1, further comprising:
display means having a plurality of display units; and
wherein said data processing means includes means for turning on a predetermined display unit in said display means when said first mode data is stored in said first memory means, and for turning off said predetermined display unit when said second mode data is stored in said first memory means.

5. The electronic weight measuring device of claim 1, wherein said second memory means further includes a third memory area for storing a span coefficient which represents a ratio of a given rated span value to said span data.

6. The electronic weight measuring device of claim 1, wherein said first state of said flag data is a reset state, and said second state of said flag data is a set state.

7. The electronic weight measuring device of claim 1, wherein said data processing means further includes:
memory means for successively storing sampled data from said data generating means; and
means for detecting that a predetermined number of data among said sampled data stored in said memory means are the same values, and for then causing said sampled data to be stored into one of said first and second memory areas of said secondary memory means.

8. The electronic weight measuring device of claim 7, wherein said data processing means further includes means for detecting that the data from said data generating means is out of a predetermined range, and for preventing the difference between the out of range data and the zero point data from being stored as span data in said second memory area of said second memory means.

9. The electronic weight measuring device of claim 7, wherein said data processing means further includes means for detecting that the data from said data generating means is out of a predetermined range, and for preventing the out of range data from being stored as zero point data in said first memory area of said second memory means.

10. The electronic weight measuring device of claim 9, wherein said data processing means further includes means for detecting that the data from said data generating means is out of a predetermined range, and for preventing the difference between the out of range data and the zero point data from being stored as span data in said second memory area of said second memory means.

* * * * *